United States Patent [19]

Ishiyama

[11] Patent Number: 5,594,590
[45] Date of Patent: Jan. 14, 1997

[54] MIRROR-HOUSING POSITIONING DEVICE FOR CAR REARVIEW MIRROR

[75] Inventor: Yoshihiko Ishiyama, Isehara, Japan

[73] Assignee: Ichikoh Industries, Ltd., Tokyo, Japan

[21] Appl. No.: 475,085

[22] Filed: Jun. 7, 1995

[30] Foreign Application Priority Data

Jun. 9, 1994 [JP] Japan .................................. 6-127385

[51] Int. Cl.$^6$ .................................................. G02B 5/08
[52] U.S. Cl. ............................................ 359/841; 359/872
[58] Field of Search ................................. 359/841, 872, 359/877; 248/478, 479, 483

[56] References Cited

U.S. PATENT DOCUMENTS

| | | | |
|---|---|---|---|
| 3,628,862 | 12/1971 | Stephenson | 359/876 |
| 4,544,871 | 10/1985 | Suzuki | 318/568.1 |
| 4,705,368 | 11/1987 | Manzoni | 359/876 |
| 4,986,646 | 1/1991 | Hamamoto et al. | 359/873 |
| 5,477,392 | 12/1995 | Mochizuki et al. | 359/872 |

*Primary Examiner*—Akm E. Ullah
*Attorney, Agent, or Firm*—Foley & Lardner

[57] ABSTRACT

A mirror-housing positioning device for a car rearview mirror includes a stationary member connected to a base provided in the rearview mirror, which is to be fixed to the body of a car, a rotary member held rotatably on the stationary member and connected to the mirror housing having a mirror unit of the rearview mirror assembled therein, a driving mechanism including a motor and a group of reversely rotatable gears and disposed between the stationary member and rotary member to rotate the rotary member, a mechanism provided between the rotary member and stationary member to block the rotary member from being rotated when the mirror housing is turned to any of predetermined positions, and a mechanism inhibiting the gear group from being rotated when the rotary member is blocked against rotation. The gear-group rotation inhibiting mechanism includes a first gear component forming a part of one gear in the gear group and having teeth meshed with an adjacent gear, a second gear component forming a part of the one gear in the gear group and having teeth meshed with another adjacent gear, and an elastic member which forces the first gear component to the second gear component. The first gear component has projections formed in an area thereof facing the second gear component, and the second gear component has formed therein circular concavities in which the projections of the first gear component are fitted. The elastic member maintains the projections fitted in the circular concavities.

9 Claims, 8 Drawing Sheets

MIRROR-HOUSING POSITIONING DEVICE FOR CAR REARVIEW MIRROR

BACKGROUND OF THE INVENTION a) Field of the Invention

The present invention relates to a mirror-housing positioning device for a car rearview mirror, and more particularly to an improved mirror-housing positioning device for use in a car rearview mirror having a foldable housing in which a mirror unit is assembled to turn or fold the mirror housing by a motor.

b) Prior-art Statement

Rearview mirrors of which the mirror housing having a mirror assembled therein can be turned or folded to predetermined positions are known from the disclosures in the U.S. Pat. No. 4,919,526 and Japanese Unexamined Utility Model Publication (Kokai) No. Hei-6-49203, for example. In these well-known rearview mirrors, the mirror housing is installed on either side of a car body, and adapted to take three positions: Viewing position (or normal position), and front and rear parking positions (or folded positions). Namely, the mirror housing can be turned with respect to a base fixed to the car body, by hand or as driven by a motor, and swung to the viewing position where it protrudes laterally from the car body and gives the car driver a rear view or to the rear parking position where the outer end thereof is directed toward the tail of the car body while the front side thereof faces generally directly the lateral side of the car body. Furthermore, when the mirror housing set in the viewing position is accidentally pressed by a human body or any other thing, the mirror housing can be turned in relation to the base and swung to the rear parking position or to the front parking position where the outer end thereof is directed toward the head of the car body while the rear side thereof faces generally directly the lateral side of the car body, depending upon the direction in which the mirror housing has been applied with the external force.

Major components of such a mirror-housing positioning device for a car rearview mirror are a stationary member that is to be connected to a base which in turn is to be fixed to the car body, and a rotary member that is connected to the mirror housing. The rotary member is fitted on a support shaft erected on the stationary member. A gear is provided as fitted on the rotary-member support shaft and connected to the stationary member by means of a clutch. A gear train is built in the rotary member to provide a connection between a motor for driving the rotary member and the gear on the support shaft. The gear on the support shaft works as a solar gear while a one of the gears in the train that is in mesh with the gear on the support shaft serves as a planetary gear. As the rotary member is rotated about the support shaft along with the motor and gear train, the mirror housing is tuned to the viewing or rear parking position. When the rotary member has been rotated to a predetermined position where it is blocked from further rotation, a larger current starts flowing through the motor, whereby the motor torque is increased and the gears are engaged at the teeth thereof to each other with no backlash between them. The above-mentioned clutch consists of the gear on the support shaft, a clutch disk disposed between the gear and rotary member, and a clutch spring that forces the rotary member to the clutch disk. When the mirror housing is turned by hand or when it is accidentally pressed by a human body or any other thing while the motor is out of operation, the gear on the support shaft is caused to slide in relation to the clutch disk, and the rotary member can be rotated on the support shaft along with the motor, gear train and the gear on the support shaft.

The gear on the support shaft and those in the gear train employed in these conventional mirror-housing positioning devices are spur gears. The spur gears can be manufactured with reduced costs, and show a higher transmission coefficiency than worm gears do. Therefore, any smaller-power motor commercially available at a lower price can be used in the mirror-housing positioning device. However, when an external force such as vibration of the car body is applied to the mirror housing, one of the gears in the gear train that is in mesh with the gear on the support shaft rotates and revolves, and the motor and gear train rotate reversely, resulting in an easy displacement of the mirror housing from its set position. Also when the mirror housing is turned by hand or when it is accidentally pressed by a human body or any other thing, a part of the force having acted on the rotary member through the mirror housing is consumed for reverse rotation of the gear train and motor. Namely, this loss of force causes the clutch disconnection to not be smoothly done.

Also, the Japanese Unexamined Utility Model Publication (Kokai) No. Hei-6-49203 discloses a mirror-housing positioning device of a similar structure to that of the above-mentioned prior-art positioning devices. In this mirror-housing positioning device, the stationary member has formed therein sector recesses each stepped at both ends thereof. A ball is provided as received in each of these sector recesses. One of these balls is always beneath one of the gears in the gear train provided in the rotary member. A rod, for example, is provided between the gear and ball in such a manner as to be held slidably axially of the gear train in relation to the rotary member. When the mirror housing is turned to the viewing or rear parking position and thus the ball under the gear rides on the step at the end of the sector recess, the rod will slide to raise the gear and thus the other gears on the same gear shaft. Therefore, the gears are forced to each other and to the rotary member. The gears are blocked against rotation.

In this mirror-housing positioning device, when the mirror housing is turned to the viewing position or rear parking position, the gear in the gear train that is nearest to the rod is raised by the rod, and the other gears are also raised one after another and forced to each other. Thus, the gears are locked against rotation. Any vibration of the car body or the like will not cause the mirror housing to displace from its set position. Also, when the mirror housing is turned by hand or when it is pressed accidentally by a human body or any other thing, the clutch disconnection can be done smoothly. In these conventional mirror-housing positioning devices, however, when the mirror housing is turned to the viewing position or parking position, the teeth of each gear are in mesh with each other with the backlash deviated to any one side thereof so that the teeth are strongly forced to each other. Since the force applied to the teeth varies from one gear to another, some of the gears are not moved successfully so that the gear rotation is blocked at one time or not blocked at other time. For a smooth movement of the gears, each of the gears must be machined with a higher precision and the clearance between the gear and gear shaft be accurately adjusted for each gear. These precision machining and accurate clearance adjustment have to be done for all the mirror-housing positioning devices.

SUMMARY OF THE PRESENT INVENTION

The present invention has an object to provide an improved mirror-housing positioning device for use in a car rearview mirror, in which any vibration of the car body does not cause the mirror to displace from its set position, in which the mirror housing can be positively turned and in which a gear train adopted therein can always be stably stopped from rotating without the necessity of any special adjustment, when it is accidentally pressed by the human body or any other thing.

According to an aspect of the present invention, a mirror-housing positioning device for a car rearview mirror is provided which comprises a stationary member connected to a base provided in the rearview mirror, which is to be fixed to the body of a car; a rotary member held rotatably on the stationary member and connected to a mirror housing in which a mirror unit of the rearview mirror assembled; a driving mechanism including a motor and a group of reversely rotatable gears and disposed between the stationary member and rotary member to rotate the rotary member; a mechanism provided between the rotary member and stationary member to block the rotary member from being rotated when the mirror housing is turned to any of predetermined positions; and a mechanism inhibiting the gear group from being rotated when the rotary member is blocked against rotation, the mechanism to inhibit the gear group from being rotated, comprising a first gear component forming a part of one gear in the gear group and having teeth which are in mesh with an adjacent gear, a second gear component also forming a part of the one gear in the gear group and having teeth which are in mesh with another adjacent gear, and an elastic member forcing the first gear component to the second gear component; the first gear component having projections formed in an area thereof facing the second gear component; the second gear component having formed therein concavities in which the projections of the first gear component are fitted, the elastic member maintaining the projections fitted in the concavities.

According to another aspect of the present invention, a mirror-housing positioning device for a car rearview mirror is provided which comprises a stationary member connected to a base provided in the rearview mirror, which is to be fixed to the body of a car; a rotary member held rotatably on the stationary member and connected to the mirror housing in which a mirror unit of the rearview mirror is assembled; a support shaft provided on the stationary member, on which the rotary member is rotatable; a spur or helical gear loose-fitted on the support shaft; a clutch disk disposed between the gear on the support shaft and the rotary member, fitted on, and connected to, the support shaft; a clutch spring forcing the gear on the support shaft to the clutch disk; a motor built in the rotary member; a group of spur gears loose-fitted on gear shafts fixed to the rotary member to give a connection between the motor and the gear on the support shaft; sector recesses formed in the stationary member concentrically to the axis of rotation of the rotary member; and balls held on the rotary member correspondingly to the sector recesses; one of the gears in the gear group, comprising a first gear component which is in mesh with an adjacent gear located on the motor side and a second gear component which is in mesh with a gear located at the gear side of the support shaft; the first gear component having formed in an area thereof facing the second gear component circular projections positioned on a circle concentric to the axis of rotation of the first gear component; the second gear component having formed therein circular concavities in which the circular projections on the concentric circle are fitted; a coil spring being provided between a gear located at the end of the same gear shaft and the rotary member to maintain the connection between the first gear component and second gear component by means of the gear on the gear shaft.

How the foregoing and other more specific objects of the present invention are achieved will appear in the ensuing more detailed description of an illustrative embodiment of the present invention that will now be set forth in reference to the drawings.

DETAILED DESCRIPTION OF THE PREFERRED EMBODIMENTS

As shown in FIGS. 1 to 7, the mirror-housing positioning device for a car rearview mirror comprises a rotary member 1 connected to a mirror housing in which a mirror unit of the rearview mirror is assembled, and a stationary member 2 connected to a base of the rearview mirror that is to be fixed to the car body.

The stationary member 2 consists of a generally flat body 2A having a hollow support shaft 2B formed integrally on one side thereof. The rotary member 1 consists of a box-like body 1A open at the top thereof, a generally flat partition 21 and a box-like lid 24 open at the bottom thereof. The partition 21 is fitted and joined to the opening of the body 1A. The lid 24 is fitted at the bottom end thereof in a circumferential socket formed in the lateral walls of the body 1A defining together the top opening of the body 1A, and it is sealed with a liquid sealant put in the socket. The rotary member 1 is assembled to the stationary member 2 with the support shaft 2B of the stationary member 2 introduced into holes formed in the body 1A and partition 21, respectively. Thus, the rotary member 1 is rotatable on the support shaft 2B. A sliding plate 4 is provided as fitted on the support shaft 2B and also between the rotary member 1 and stationary member 2 to assure a smooth rotation of the rotary member 1 on the stationary member 2.

An electric motor 22 is provided inside the rotary member 1, a gear 7 is provided on the support shaft 2B, and a train of gears 11 to 19 is provided between the gear 7 and motor 22 in the rotary member 22. Thus, the rotary member 1 is rotated through the cooperation of these elements.

The motor 22 is disposed in a chamber defined, at the upper portion of the rotary member 1, by the partition 21 and lid 24 with the shaft of the motor 22 passed through a hole formed in the partition 21. The motor 22 is fixed to the partition 21. One (19) of the gears in the train is fitted on and fixed to a portion of the motor shaft that extends in the chamber. The gear 7 is loose-fitted on the support shaft 2B and connected to the support shaft 2B by means of a clutch as will be further described later. The gears 11 to 18 in the train are disposed between the gear 19 on the shaft of the motor 22 and the gear 7 on the support shaft 2B, and also loose-fitted on gear shafts 10A and 10B. The gear shafts 10A and 10B are disposed parallel to the support shaft 2B and cross the bottom wall of the body 1A and partition 21, and fitted on and fixed to, at opposite ends thereof, the body 1A and partition 21, respectively. The gears 11, 13, 15 and 18 of the gears (11 to 19) in the train are loose-fitted on the gear shaft 10A, while those 12, 14 and 17 are loose-fitted on the gear shaft 10B. As evident from FIG. 7, the gear 11 is an ordinary spur gear while each of the gears 12 to 18 is a composite gear composed of two spur gears different in nominal diameter from each other, coaxially disposed and formed integrally with each other. That is to say, each of these gears 12 to 18 consists of an upper spur gear and lower spur gear. The gear 18 in mesh with the gear 19 on the shaft of the motor 22 is engaged at the lower spur gear thereof with the upper spur gear of the gear 17. The gear 17 is engaged at the lower spur gear thereof with the upper spur gear of the gear 16. The gear 16 is engaged at the lower spur gear thereof with the upper spur gear of the gear 15. The gear 15 is engaged at the lower spur gear thereof with the upper spur gear of the gear 14. The gear 14 is engaged at the lower spur gear thereof with the upper spur gear of the gear 13. The gear 13 is engaged at the lower spur gear thereof with the upper spur gear of the gear 12. The gear 12 is in mesh with the gear 7 on the support shaft 2B. When the motor 22 is put into run, the gear 19 drives the gear 18, and thus the gears 18 to 11 are rotated sequentially. The gear 11 works as a planetary gear. Namely, the gear 11 rotates and revolves about the gear 7 while being engaged with the latter serving as the solar gear. Thus the rotary member i is rotated about the support shaft 2B.

The above-mentioned clutch is provided between the gear 7 and stationary member 2. The clutch is destined to rotate the rotary member 1 when the rotary member 1 is applied with a force larger than a torque with which the rotary member 2 is rotated by the motor 22. In this embodiment, a clutch called "claw clutch", "dog clutch" or the like is employed. The clutch itself includes the gear 7 on the support shaft 2B, and it is composed of a clutch disk 6 disposed between the gear 7 and stationary member 2, and a clutch spring 8. The gear 7 has a recess, for example, formed on the side thereof opposite to the clutch disk 6. The clutch disk 6 has formed on the side thereof opposite to the gear 7 a claw that is fitted in the recess in the gear 7. The clutch disk 6 and gear 7 are fitted on the support shaft 2B with the claw fitted in the recess. The clutch disk 6 is fitted slidably, not rotatably, on the support shaft 2B, while the gear 7 is fitted rotatably and slidably on the support shaft 2B. To this end, the support shaft 2B is made fiat at a circumferential portion thereof on which the clutch disk 6 is fitted. The hole in the clutch disk 6 is shaped correspondingly to the sectional shape of the support shaft 2B. The clutch disk 6 is fitted on the fiat portion of the support shaft 2B. The hole in the gear 7 in which the support shaft 2B is fitted is shaped round correspondingly to the diameter of the support shaft 2B. The gear 7 is fitted on the portion of the support shaft 2B that has a circular sectional shape. The clutch spring 8 is a coil spring, and disposed as compressed on the support shaft 2B between the gear 7 and a spring bearing 9 fixed to the support shaft 2B. The clutch spring 8 is intended to maintain the claws of the clutch disk 6 fitted in the recesses in the gear 7 while forcing the gear 7 and clutch disk 6 toward the rotary member 1. There is provided a sliding plate 5 fitted on the support shaft 2B between the clutch disk 6 and stationary member 2. Hence, when the rotary member 1 is applied with a great force, the claws of the clutch disk 6 are disengaged from the recesses in the gear 7, the motor 22, gears 11 to 19 and rotary member 1 are rotated together, and the rotary member 1 is rotated on the support shaft 2B. If the rotary member 1 is inhibited from being rotated, the claws of the clutch disk 6 are disengaged from the recesses in the gear 7, whereby the motor 22 can be protected against application of any excessively large force.

Figure 3:
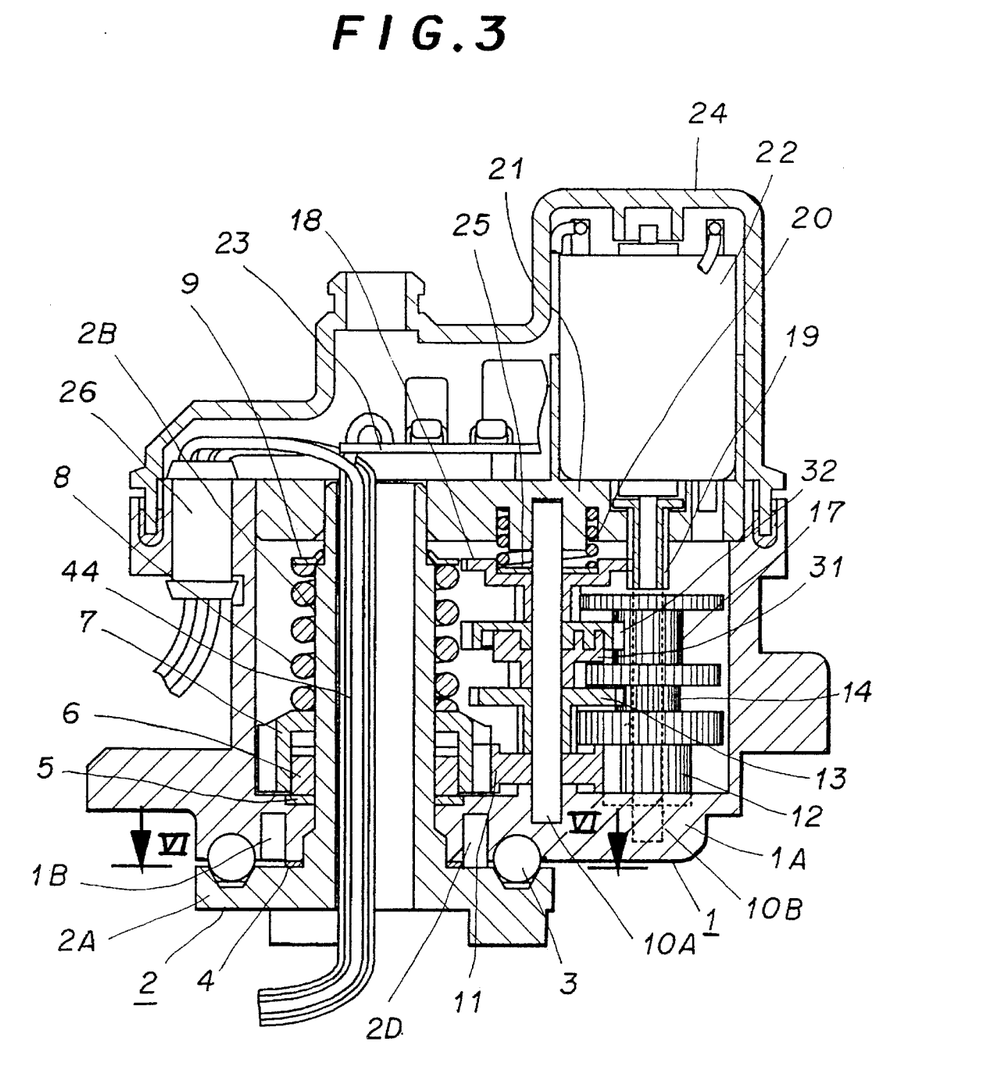
FIG. 3 is a sectional view, enlarged in scale, taken along the line III—III in FIG. 1.
Figure 4:
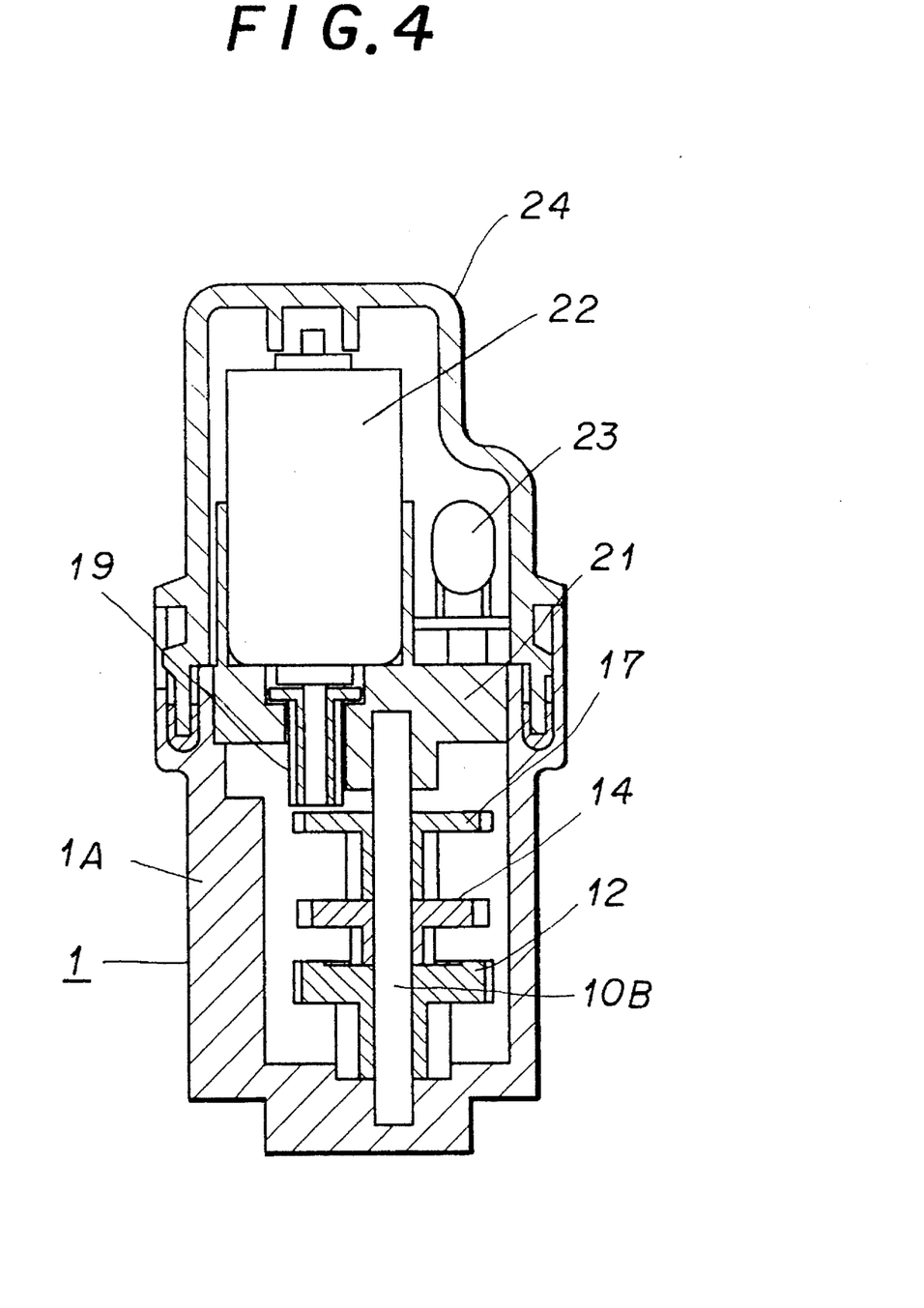
FIG. 4 is a sectional view taken along the line IV—IV in FIG. 1 with some components omitted for simplicity of illustration.
Figure 5:
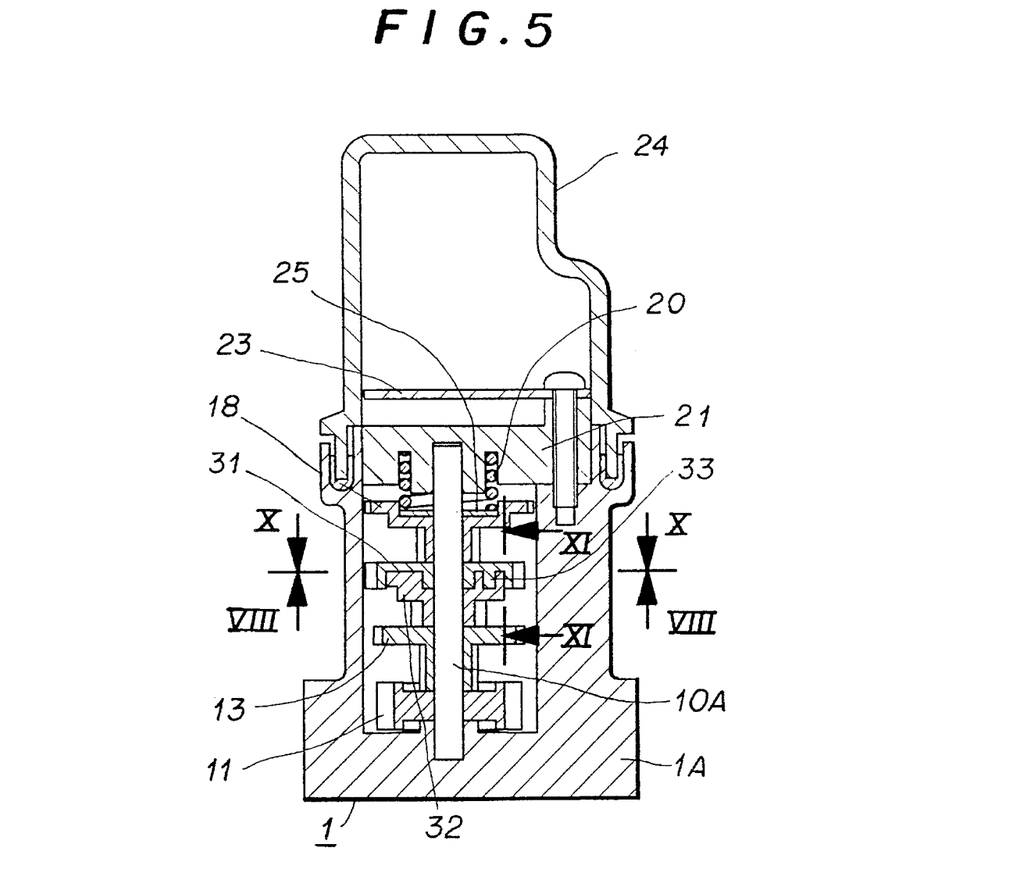
FIG. 5 is a sectional view taken along the line V—V in FIG. 1 with some components omitted.
Figure 6:
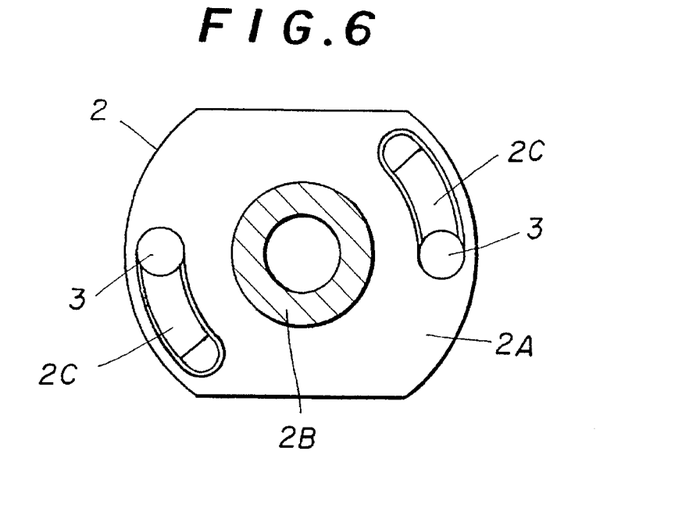
FIG. 6 is a sectional view taken along the line VI—VI in FIG. 3.
Figure 7:
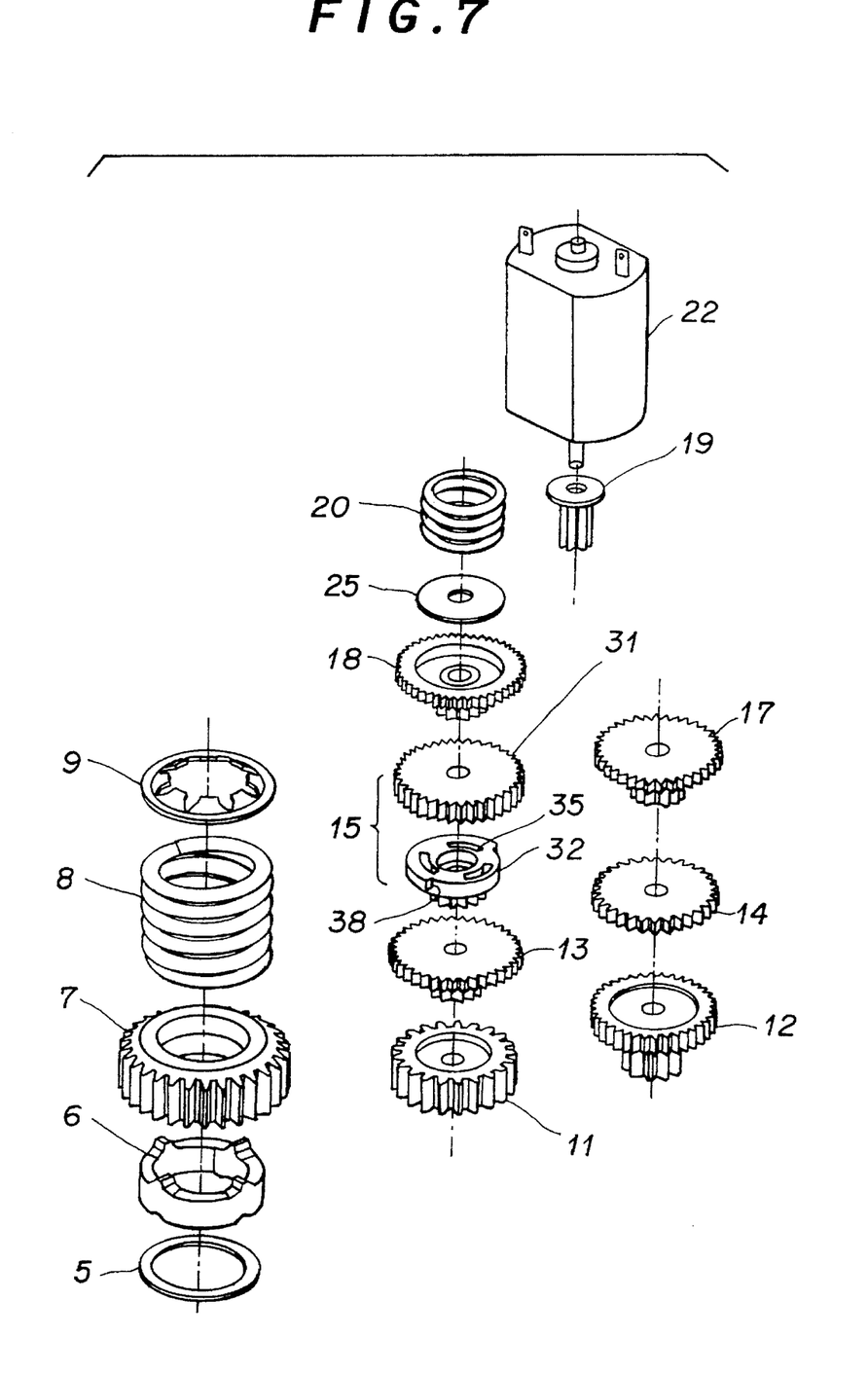
FIG. 7 is an exploded perspective view of the driving mechanism used in the mirror-housing positioning device.

The rotary member 1 are provided with balls 3, and the stationary member 2 has recesses 2C formed therein. These balls 3 and sector recesses 2C cooperate with a circuit formed between the motor 22 and a power source and which is included in the drive unit for the motor 22 to limit the angle of rotation of the rotary member 1. As best seen from FIG. 6, the sector recesses 2C are formed in a pair. They are formed in the body 2A of the stationary member 2 as positioned on an imaginary circle concentric to the support shaft 2B or the axis of rotation of rotary member 1 and symmetrical with respect to the axis of rotation of the rotary member 1. Each of these sector recesses 2C is stepped at opposite ends thereof. More particularly, the recess is shallower at the end thereof than at the middle portion. All the side walls of the recess are inclined from the surface of the body 2A toward the recess bottom while the ends at the respective steps of the recess are inclined from the step surface toward the recess bottom. The balls 3 are held rotatably in concavities formed in the bottom wall of the body 1A of the rotary member 1. When the rotary member 1 is fitted on the support shaft 2B of the stationary member 2, the balls 3 fall into the sector recesses 2C, respectively. When the rotary member 1 is rotated, the balls 3 are moved rolling together with the rotary member 1 to ride on any of the end steps of the sector recesses 2C. The circuit included in the drive unit for the motor 22 disconnects the motor 22 from the power source when the balls 3 ride on any of the end steps of the sector recesses 2C. The circuit itself is so configured as disclosed in the Japanese Unexamined Utility Model Publication (Kokai) No. Hei-4-76196, for example, as to detect, by a positive thermistor, an overcurrent flowing through the motor 22 as the load to the motor 22 increases when the ball 3 rides on any of the end steps of the recess 2C, thereby disconnecting the motor 22 from the power source, and to connect the motor 22 to the power source when the load to the motor 22 decreases. As shown in FIG. 3, the rotary member 1 has a circular recess 1B formed in the bottom thereof opposite to the stationary member 2. As shown in FIGS. 3 and 7, the stationary member 2 is provided with a pin 2D extending into the circular recess 1B. Abutting either of the ends of the circular recesses 1B, the pin 2D limits the maximum angle of rotation of the rotary member 1.

Figure 8:
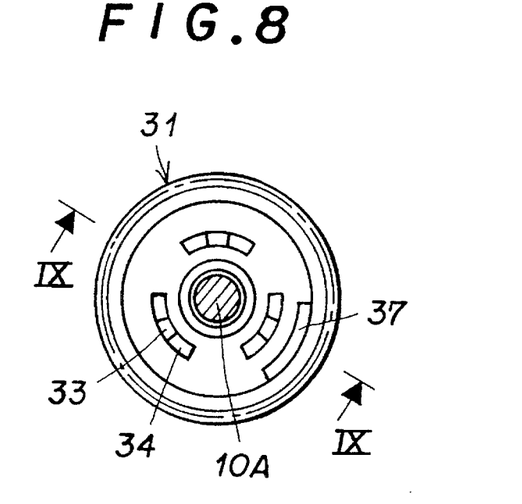
FIG. 8 is a sectional view taken along the line VIII—VIII in FIG. 5.
Figure 9:
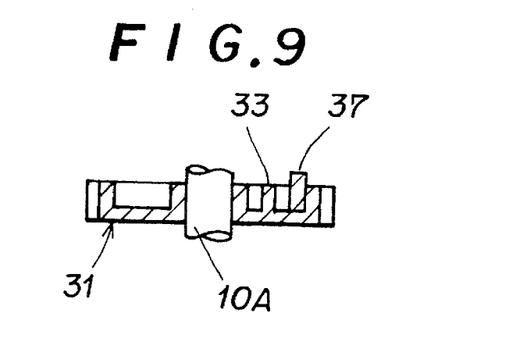
FIG. 9 is a sectional view taken along the line IX—IX in FIG. 8.
Figure 10:
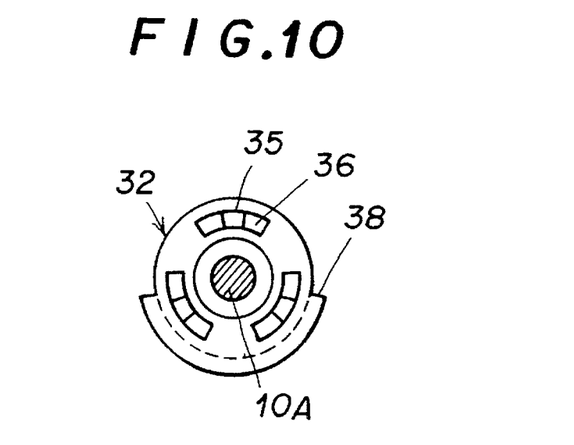
FIG. 10 is a sectional view taken along the line X—X in FIG. 5.

In the mirror-housing positioning device according to the present invention, the gear 15 among the gears 11 to 18 located between the motor 22 and the support shaft 2B of the stationary member 2 is composed of two components 31 and 32. The first one (31) of these gear components has the general shape of a disk. It is loose-fitted on the gear shaft 10A and engaged with the gear 17. As shown in FIG. 8, the first gear component 31 has three circular projections 33 provided on a surface thereof facing the second gear component 32. The circular projections 33 are positioned on a same circle concentric, and equiangularly with respect, to the axis of rotation of the first gear component 31. They are circular walls or projections formed integrally with the component 31 and of which the circumferential ends are made as slopes 34 each inclined upwardly from the surface of the component 31 toward the projecting apex. Similarly, the second gear component 32 is also like a disk. The component 32 is loose-fitted on the gear shaft 10A and in mesh at the circumferential teeth thereof with the gear 14. As best shown in FIGS. 7 and 10, the second gear component 32 has three circular concavities 35 formed in the surface thereof opposite to the first gear component 31. The circular concavities 35 are positioned on an imaginary circle on which also the circular projections 33 lie, and equiangularly with respect to the axis of rotation of the first gear component 32. Each of the circular concavities has the circumference thereof defined by slopes 36 each inclined from the surface of the component 32 toward the recess bottom. When assembled with the second gear component, the first gear component 31 is fitted on the gear shaft 10A with the circular projections 33 fitted in the circular concavities 35, respectively. The teeth of the first gear component 31 are in mesh with the gear 17 while those of the second gear component 32 are engaged with the gear 14. When the first gear component 31 is rotated by the motor 22 by means of the gears 19 and 18, the circular projections 33 are disengaged from the circular concavities 35 and moved to a zone between the circular concavities 35 on the surface of the second gear component 32 so that the component 32 becomes slidable along the gear shaft 10A. As evident from FIG. 9, the first gear component 31 has a circular protrusion 37 formed integrally on a surface thereof opposite to the second gear component 32, and the second gear component 32 has also a circular protrusion 38 formed integrally on the outer circumference thereof. The first circular protrusion 37 is so provided on the first gear component 31 as to extend toward the outer circumference of the second gear component 32 from a zone of the lower side of the first gear component 31 opposite to the second gear component 32. The second circular protrusion 38 is disposed on the outer circumference of the second gear component 32 in such a manner that the end face of the second circular protrusion 38 abuts the first circular protrusion 37 when the first gear component 31 is rotated. More particularly, these first and second protrusions 37 and 38 are so disposed on the first and second gear components 31 and 32, respectively, as to inhibit the circular projection 33 from engaging into a next one of the circular concavities 35 and rotate the first and second gear components 31 and 32 together. A generally disk-like spring bearing 25 is provided as loose-fitted on the gear shaft 10A as placed in contact with the gear 18. Also a coil spring 20 is provided as fitted on the gear shaft 10A with one end thereof fixed on the spring bearing 25 and the other end fitted on the gear shaft 10A as placed in another spring bearing formed in the partition 21 around the gear shaft 10A. The coil spring 20 works to force the first gear component 31 to the second gear component 32 by means of the gear 18, thereby maintaining the circular projections 33 fitted in the circular concavities 35.

The mirror-housing positioning device according to the present invention is assembled into a car rearview mirror by installing it into the mirror housing 41 of the rearview mirror in such a manner that the axis of rotation of the rotary member 1 coincides with that of the mirror housing 41 having the mirror unit of the rearview mirror assembled therein, and connecting the stationary member 2 to the rearview mirror base 43 that is to be fixed to the car body.

Figure 1:
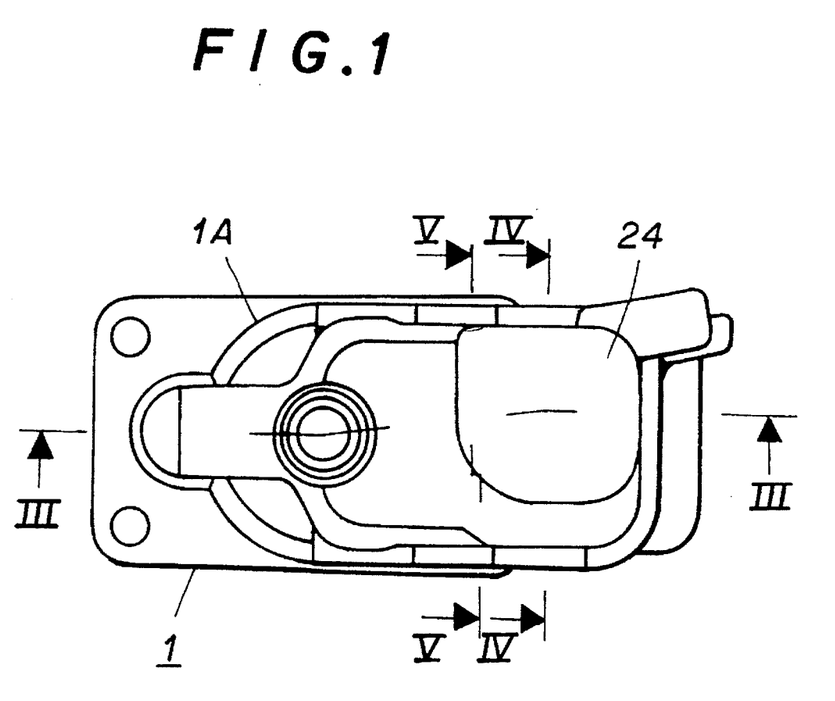
FIG. 1 is a plan view of a first embodiment of the mirror-housing positioning device according to the present invention.
Figure 2:
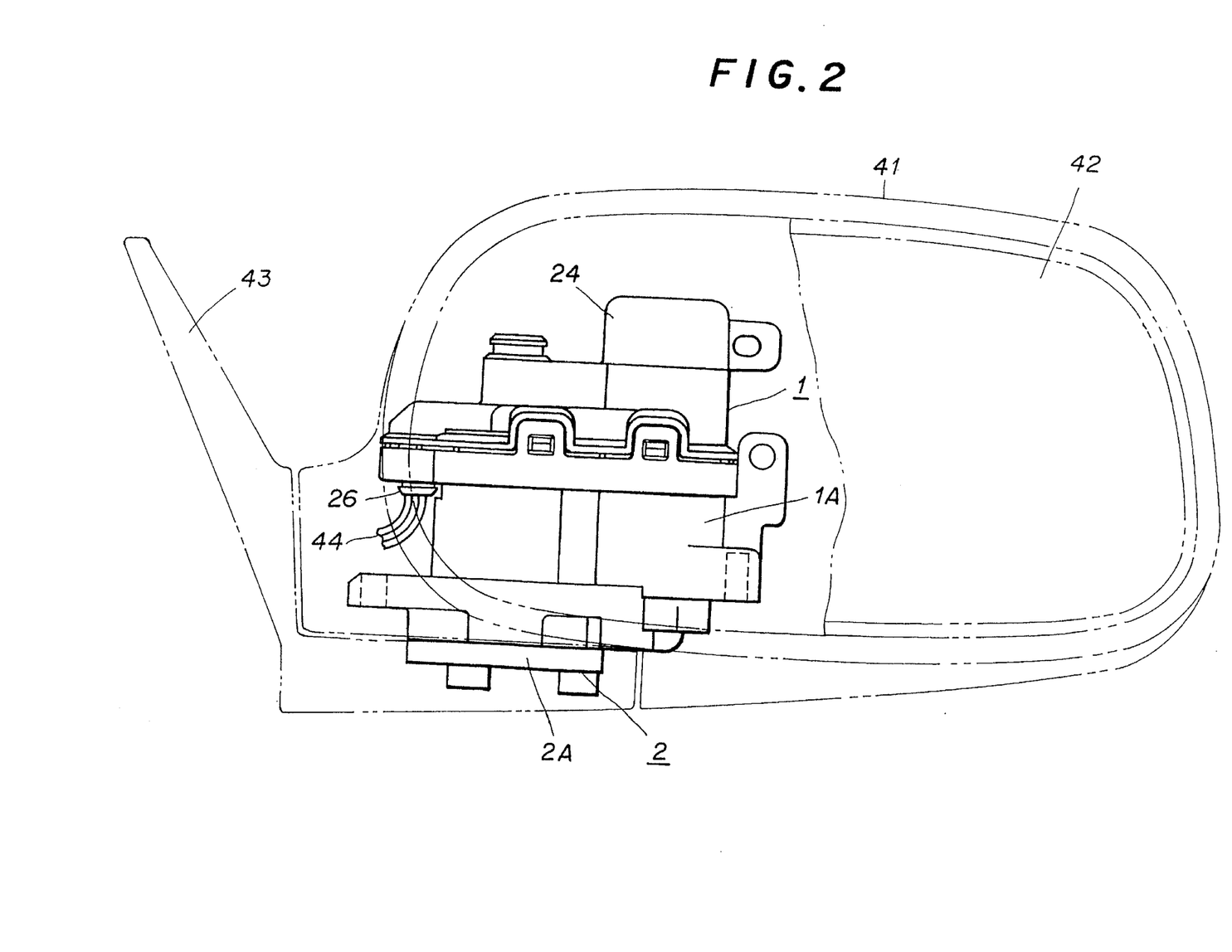
FIG. 2 is a front view of the mirror-housing positioning device in FIG. 1.

The rearview mirror is provided with the mirror housing 41 as shown in FIG. 2. The mirror housing 41 is a thin hollow box open at a portion of the front side thereof. The mirror housing 41 has disposed in the front opening thereof a mirror unit 42 consisting of a mirror and a holder for the mirror. The mirror unit 42 is coupled to a ball joint included in a mirror tilting mechanism disposed behind the mirror unit 42 and bolted to the mirror housing 41. The mirror tilting mechanism comprises, for example, two rods, motors for moving the rods independently of each other, motion conversion and speed reduction mechanisms, etc. To tilt the mirror unit 42, one of the rods is moved by means of one of the motors and the motion conversion and speed reduction mechanisms to push the mirror holder at the rear lower portion thereof, thereby turning the mirror unit 42 vertically about the ball joint, while the other rod is moved by the other motor and the motion conversion and speed reduction mechanisms to push the mirror holder at the rear lateral portion thereof, thereby turning the mirror unit 42 horizontally about the ball joint. The rearview mirror also comprises a base 43 having the general shape of "L" of which the one arm is to be fixed to the body of a car. To assemble the positioning device according to the present invention for the mirror housing 41 into the rearview mirror, the stationary member 2 introduced into the mirror housing 41 through an opening thereof formed in a circumferential area of the mirror housing 41 that serves as the bottom thereof, the rotary member 1 is bolted to the mirror housing 41, the stationary member 2 is connected by bolting or otherwise to the other arm of the "L-shaped"0 base 43, and electrically connecting a drive circuit (which is formed on a circuit board 23 shown in FIG. 3) for the motor 22 to a controller which is provided inside the car body. A cable 44 is laid as extending from the controller provided inside the car body into the lid 24 through the car body and support shaft 2B. A portion of the cable 44 is connected to the circuit board 23 while the remainder of the cable 44 is led through a rubber bush 26 fitted in the lid 24 to outside the positioning device and connected to the motors included in the tilting mechanisms for the mirror unit 42.

Figure 12:
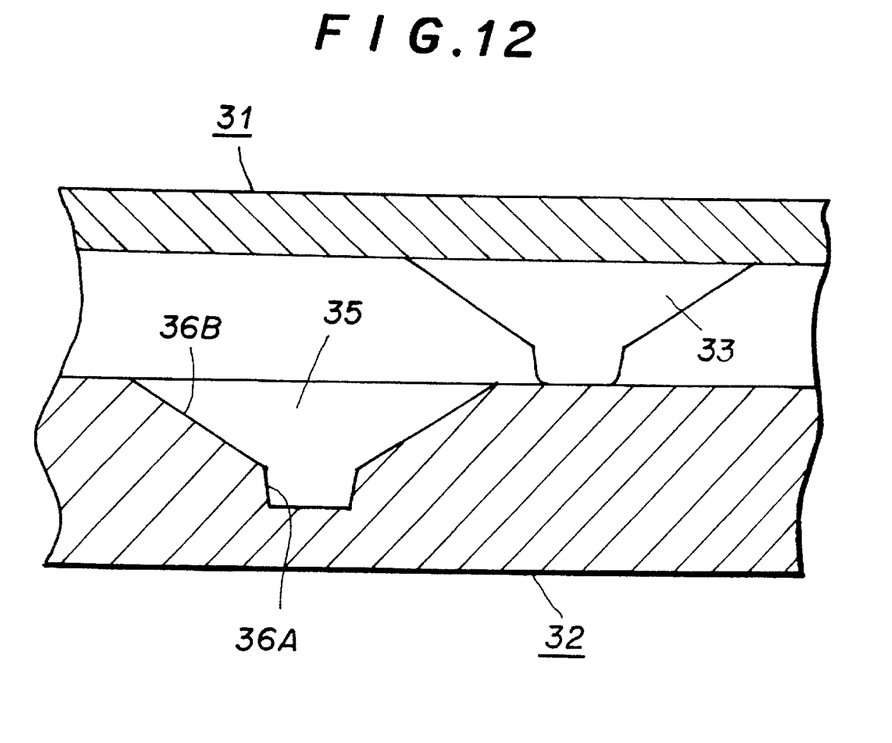
FIG. 12 is a sectional view, enlarged in scale, also taken along the line XI—XI in FIG. 5, showing a different operation from that in FIG. 11

The mirror housing 41 is turned by the motor 22 that is put into operation by the driver of the car who operates the controls forming a part of the controller. It is now assumed that the mirror housing 41 protrudes laterally from the car body, namely, that the mirror housing 41 stays in the predetermined viewing position where it gives the car driver a rearview. When the motor 22 is put into run in this condition, the gear 19 drives the gear 17 and the gears 15 to 11 are sequentially rotated. The gear 11 serving as a planetary gear rotates and revolves about the gear 7 while being in mesh with the latter working as a solar gear. Thus the rotary member 1 is rotated about the support shaft 2B and the mirror housing 41 is turned toward the tail of the car body, namely, toward the viewer of the drawing sheet carrying FIG. 2. If the mirror housing 41 is turned from the viewing position to a predetermined position where it is generally parallel to the lateral side of the car body and the balls 3 move from their end positions shown in FIG. 6 onto the steps at the opposite ends in the sector recesses 2C, the motor 22 is disconnected from the power source and thus the mirror housing 41 is stopped from turning. When the car driver operates the controls again to reversely run the motor 22, the gears 19 to 11 are rotated reversely. The planetary gear 11 rotates and revolves about the gear 7 reversely while being engaged with the latter. The rotary member 11 is rotated reversely on the support shaft 2B and thus the mirror housing 41 is turned from the rear parking position to the viewing position. When the mirror housing 41 has been turned to the viewing position and the balls 3 have been returned to their initial positions and ridden on the end steps of the sector recesses 2C, the motor 22 is disconnected from the power source. However, the gears 19 to 11 are locked against rotation immediately before the motor 22 is deenergized. More specifically, when the mirror housing 41 is turned from the viewing position to the rear parking position as having been described above and the balls 3 ride on the end steps of the sector recesses 2C, the load to the motor 22 increases, the torque of the motor 22 increases and thus the gears 19 to 11 are further rotated. Since the gear 7 on the support shaft 2B is locked against rotation, the gears 19 to 11 are forced at the teeth thereof onto the corresponding gears and so stopped from rotating with the backlash onesided. The second gear component 32 in mesh with the gear 17 is inhibited together with the gears 15 to 11 from being rotating. Since the gears 19 to 17 are driven by the motor 22 at this time, the first gear component 31 is rotated, the circular projections 33 are disengaged from the circular concavities 35 in the second gear component 32 as shown in FIG. 12, and moved to zones between the circular concavities 35 on the surface of the second gear component 32. The coil spring 20 is further compressed as the gear 18 and first gear component 31 slide, and the gear 18 is forced to the first gear component 31 under the resilience of the coil spring 20. Since the gears 19 to 11 are thus not reversely rotated, the mirror housing 41 will not be turned but stay in the viewing position even if a vibration of the car body is applied to the rearview mirror after the mirror housing 41 has been turned to the rear parking position. The motor 22 is disconnected from the power source when or after the gear is locked against rotation.

Figure 11:
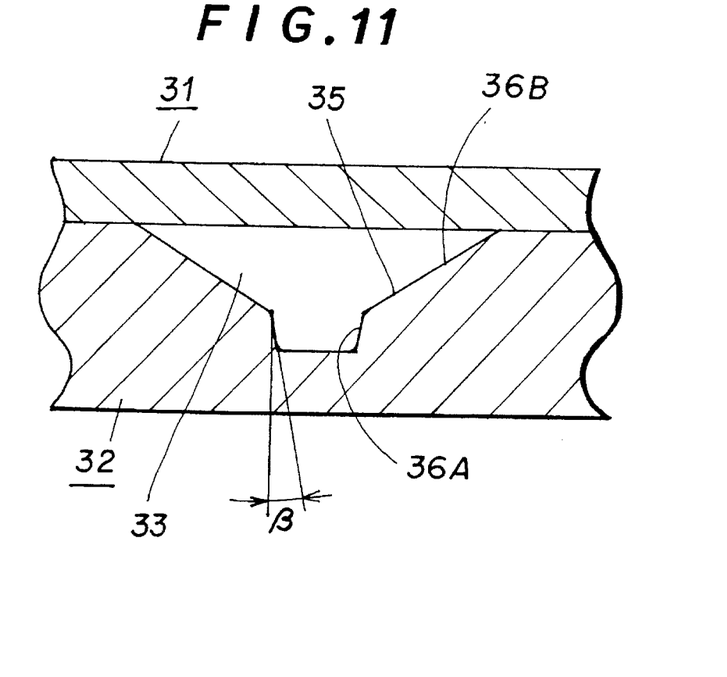
FIG. 11 is a sectional view, enlarged in scale, taken along the line XI—XI in FIG. 5.

When the motor 22 is put into a reverse run by the drive unit through the operation of the controls by the car driver to turn the mirror housing 41 from the viewing position to the rear parking position, the gear 19 drives the gears 18 and 17. The first gear component 31 is rotated, the circular projections 33 enter the circular concavities 35 in the second gear component 32 as shown in FIG. 11 and the first circular protrusion 37 on the component 31 abuts the second circular protrusion 38 on the component 32, thus the component 31 starts rotating along with the component 32. This rotation is transmitted to the gear 11 via the gears 14 to 12, the gear 11 rotates and revolves while being in mesh with the gear 7, and the mirror housing 41 is turned about the support shaft 2B toward the viewing position. When the balls 3 ride on the end steps of the sector recesses 2C, the load to the motor 22 increases, the torque of the motor 22 increases and thus the gears 11 to 14 are further rotated. Since the gear 7 on the support shaft 2B is locked against rotation, the gears 11 to 14 are forced at the teeth thereof onto the corresponding gears and so stopped from rotating with the backlash onesided. The second gear component 32 in mesh with the gear 14 is inhibited together with the gears 11 to 14 from being rotating. Since the gears 19 to 17 are driven by the motor 22 at this time, the gears 19 to 17 and first gear component 31 are rotated, the circular projections 33 are disengaged from the circular concavities 35 in the second gear component 32 as shown in FIG. 12 and moved to zones between the circular concavities 35 on the surface of the second gear component 32. The coil spring 20 is further compressed as the gear 18 and first gear component 31 slide, and the first gear component 31 is forced to the second gear component 32. Thus the gears 19 to 11 are stopped from being rotated. The mirror housing 41 will not be turned from the viewing position even if a vibration of the car body is applied to the rearview mirror.

Since the first gear component 31 is forced to the second gear component 32 under the action of the coil spring 20 when the mirror housing 41 and rotary member 1 are thus turned to the viewing position or rear parking position, it is rotated very slightly while sliding and moves little vertically, along with the gear 18 and spring bearing 25, in relation to the coil spring 20. In the mirror-housing positioning device, however, the slopes 36 of each of the circular concavities 35 in the second gear component 32 include each two slope portions 36A and 36B as shown in FIG. 12. The angle β of the slope portion 36A with respect to an axis parallel to the axis of rotation of the second gear component 32 is smaller than that of the slope portion 36B. The two slopes 34 are downwardly contiguous from the circular projection 33 on the bottom of the first gear component 31. The slopes 34 extend in the rotating direction of the component 31. The above-mentioned angle β of the slope portion 36A of the slope 36 of the circular concavity 35, on which the first gear component 31 moves very slightly vertically, is smaller than that of the other slope portion 36B. Therefore, the first gear component 31 rotates very little while moving up and down very little and sliding along with the gear 18 and spring bearing 25 in relation to the coil spring 20. Thus the coil spring 20 is little compressed, the pressure of contact between the coil spring 20 and spring bearing 25 is not increased, and also the sound caused by the friction between the coil spring 20 and spring bearing 25 is reduced. Further, the action of the coil spring 20 will not cause the gears 18 to 11 to be in contact with each other under an increased pressure. So, the motor 22 may not be any one having a torque large enough for the possible increase of the contact pressure of the gears 18 to 11. Namely, the motor 22 may be more compact. More specifically, the manufacturing costs for the motor can be reduced, the power consumption be smaller, and the positioning device itself can be designed more compact.

If the mirror housing 41 is in the viewing position and the motor 22 is disconnected from the power source when a human body or any other thing collides with the mirror housing 41, the claws of the clutch disk 6 composing the clutch between the gear 7 and stationary member 2 are disengaged from the recesses in the gear 7, the gear 7 is rotated on the support shaft 2B along with the rotary member 1 while being in mesh with the gear 11, and the mirror housing 41 is turned to the rear parking position or the front parking position set opposite to the rear parking position with the viewing position set between the parking positions, depending upon the direction of the force applied by the human body or thing to the mirror housing 41. As the mirror housing 41 is thus turned, the balls 3 are moved onto the surface of the stationary member 2 beyond the ends of the sector recesses 2C to raise the rotary member 1 along with the mirror housing 41 and further moved on the surface of the stationary member 41 while further compressing the coil spring 8. At this time, the gear 15 is stopped from rotating as mentioned above, and the force applied to the mirror housing 41 disables the gears 11 to 19 and motor 22 from being rotated reversely. So the force applied to the mirror housing 41 is consumed only for disengaging the claws of the clutch disk 6 from the recesses in the gear 7. The claws of the clutch disk 6 can be disengaged positively and smoothly from the recesses in the gear 7. Therefore, even when the mirror housing 41 at the viewing position is accidentally pressed by a human body or any other thing, it is positively turned to either the front or rear parking position so that the possible damage to the human body or thing will be minimum. The mirror housing 41 thus turned can be returned to the viewing position by pressing it by hand. When the mirror housing 41 is pressed, the balls 3 are put into the sector recesses again, the rotary member 1 is lowered along with the mirror housing 41, the claws of the clutch disk 6 are put into the recesses in the gear 7 under the action of the coil spring 8, and thus the rotary member 1 is forced to the stationary member 2. At the front and rear parking positions, the pin 2D of the stationary member 2 abuts the end of the circular recesses 1B to block the mirror housing 41 from being turned.

The manual adjustment of the mirror position is done with the motor 22 being stopped. The car driver does it by pressing the mirror housing 41. When the mirror housing 41 is pressed by hand, the claws of the clutch disk 6 are disengaged from the recesses in the gear 7 so that the rotary member 1 is rotated about the support shaft 2B along with the mirror housing 41. In the mirror-housing positioning device according to the present invention, the gears 11 to 18 are blocked against rotation at this time so that the claws of the clutch disk 6 are disengaged from the recesses in the gear 7 for a positive turning of the mirror housing 41, as in case the mirror housing 2 is pressed by a human body or any other thing. When the mirror housing 41 is turned to the viewing position and the balls 3 ride on the stepped ends of the sector recesses 2C, the claws of the clutch disk 6 get into the recesses of the gear 7 and the rotary member 1 is coupled to the stationary member 2, for thereby securing the mirror housing 41 in place.

According to the present invention, the gears 19 to 11 provided between the motor 22 and support shaft 2B are reversely rotatable gears such as low-cost spur gears. However, these gears can effectively stop the mirror housing 41 in the viewing or rear parking position from being turned. Even if applied with any external force such as vibration of the car body while being set in any of the viewing and rear parking positions, the mirror housing 41 does not shake or wobble. During manual adjustment of the mirror housing 41 or when the mirror housing 41 has been turned, as accidentally applied with any external force, to any undesired position, it is possible to positively turn the mirror housing 41 to a desired position. This can be attained just by modifying only a part of the gears 11 to 19 with little modification of the existing manufacturing facilities and procedures.

In the mirror-housing positioning device according to the present invention, having been described in the foregoing, all the gears 11 to 19 are spur gears. However, spur gears of which the helix angle is smaller than 15° may be used as the gears 11 to 19 and arranged in a train having such a similar configuration to that having been described in the foregoing that the gear train can be blocked from rotating.

What is claimed is:

1. A mirror-housing positioning device for a car rearview mirror, comprising:

a stationary member connected to a base provided in the rearview mirror, which is to be fixed to the body of a car;

a rotary member held rotatably on a stationary member and connected to the mirror housing in which a mirror unit of the rearview mirror is assembled;

a driving mechanism including a motor and a group of reversely rotatable gears and disposed between the stationary member and rotary member to rotate the rotary member;

a mechanism provided between the rotary member and stationary member to block the rotary member from being rotated when the mirror housing is turned to any of predetermined positions; and a mechanism inhibiting the gear group from being rotated when the rotary member is blocked against rotation, the mechanism to inhibit the gear group from being rotated, comprising:

a first gear component forming a part of one gear in the gear group and having teeth that are in mesh with an adjacent gear on one side thereof, a second gear component also forming a part of the one gear in the gear group and having teeth that are in mesh with an adjacent gear on the other side thereof, and an elastic member forcing the first gear component to the other gear component;

the first gear component having projections formed in an area thereof facing the second gear component;

the second gear component having formed therein concavities in which the projections of the first gear component are fitted;

the elastic member maintaining the projections fitted in the concavities.

2. A mirror-housing positioning device as set forth in claim 1, wherein the gears forming the gear group are spur gears, wherein the gears are loose-fitted on at least a gear shaft fixed on the rotary member and wherein the elastic member is disposed between a gear at the end of the gear shaft and wherein the rotary member.

3. A mirror-housing positioning device as set forth in claim 1, wherein the gear components have formed thereon first and second circular protrusions, respectively, which are to abut each other when the first gear component is rotated to a position where the projections are fitted in the concavities, thereby inhibiting the second gear component from being rotated.

4. A mirror-housing positioning device as set forth in claim 1, wherein each of the circular concavities is defined by a plurality of slope portions of which the end portions located in the direction of rotation are inclined upward from the bottom of the circular concavity toward the surface and the gradient of the slope portion nearest to the bottom of the circular concavity is made larger than that of the other slope portion.

5. A mirror-housing positioning device for a car rearview mirror, comprising:

a stationary member connected to a base provided in the rearview mirror, which is to be fixed to the body of a car;

a rotary member held rotatably on the stationary member and connected to a mirror housing in which a mirror unit of the rearview mirror is assembled;

a support shaft provided on the stationary member, on which the rotary member is rotatable;

a spur or helical gear loose-fitted on the support shaft;

a clutch disk disposed between the gear on the support shaft and the rotary member, fitted on, and connected to, the support shaft;

a clutch spring forcing the gear on the support shaft to the clutch disk;

a motor built in the rotary member;

a group of spur gears loose-fitted on a gear shaft fixed to the rotary member to give a connection between the motor and the gear on the support shaft;

sector recesses formed in the stationary member concentrically to the axis of rotation of the rotary member; and balls held on the rotary member correspondingly to the sector recesses;

one of the gears in the gear group, comprising a first gear component which is in mesh with an adjacent gear located on the motor side and a second gear component which is in mesh with a gear located at the gear side of the support shaft;

the first gear component having formed in an area thereof facing the second gear component circular projections positioned on a circle concentric to the axis of rotation of the first gear component;

the second gear component having formed therein circular concavities in which the circular projections on the concentric circle are fitted;

a coil spring being provided between a gear located at the end of the same gear shaft and the rotary member to maintain the connection between the first gear component and second gear component by means of the gear on the gear shaft.

6. A mirror-housing positioning device as set forth in claim 5, wherein the circumferential end portions of each of the circular concavities are defined by slopes inclined from the surface of the first gear component toward the bottom of the circular concavity and the circumferential end portions of the circular projections are defined by slopes corresponding to the slopes of the circular concavity.

7. A mirror-housing positioning device as set forth in claim 6, wherein the slopes of the circular concavity include each a plurality of slope portions inclined upwardly from the recess bottom toward the surface of the gear components, the gradient of the slope portion nearest to the recess bottom is made larger than that of the other slope portion and the slopes of the circular projections are shaped correspondingly to those of the circular concavity.

8. A mirror-housing positioning device as set forth in claim 7, wherein the first gear component has formed thereon three circular projections located on a circle of which the center lies at the axis of rotation of the first gear component and the second gear component has formed therein three circular concavities located on the circle.

9. A mirror-housing positioning device as set forth in claim 5, wherein the first gear component has a first circular protrusion formed thereon and the second gear component has formed thereon a second circular protrusion which is to abut the first circular protrusion when the first gear component is rotated to a position where the circular projections are fitted in the circular concavities, thereby inhibiting the first gear component from being rotated.

* * * * *